United States Patent
Shimomugi et al.

(10) Patent No.: US 10,404,196 B2
(45) Date of Patent: Sep. 3, 2019

(54) BACKFLOW PREVENTING DEVICE, POWER CONVERSION APPARATUS, AND REFRIGERATING AND AIR-CONDITIONING APPARATUS

(71) Applicant: Mitsubishi Electric Corporation, Tokyo (JP)

(72) Inventors: Takuya Shimomugi, Tokyo (JP); Koichi Arisawa, Tokyo (JP); Takashi Yamakawa, Tokyo (JP); Keisuke Uemura, Tokyo (JP); Noriyuki Matsubara, Tokyo (JP); Shinsaku Kusube, Tokyo (JP); Kenta Yuasa, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 14/902,039

(22) PCT Filed: Jul. 2, 2014

(86) PCT No.: PCT/JP2014/067692
§ 371 (c)(1),
(2) Date: Dec. 30, 2015

(87) PCT Pub. No.: WO2015/002249
PCT Pub. Date: Jan. 8, 2015

(65) Prior Publication Data
US 2016/0329846 A1 Nov. 10, 2016

(30) Foreign Application Priority Data

Jul. 2, 2013 (WO) .................. PCT/JP2013/068163

(51) Int. Cl.
*H02P 6/28* (2016.01)
*H02M 3/158* (2006.01)
(Continued)

(52) U.S. Cl.
CPC .............. *H02P 6/28* (2016.02); *F24F 7/007* (2013.01); *F25B 31/02* (2013.01); *H02M 1/34* (2013.01);
(Continued)

(58) Field of Classification Search
CPC .. H02P 6/28; H02P 27/06; F24F 7/007; F25B 31/02; H02M 1/34; H02M 3/158
(Continued)

(56) References Cited

U.S. PATENT DOCUMENTS 5,550,458 A * 8/1996 Farrington .............. H02M 1/34
323/222
5,731,970 A * 3/1998 Mori ....................... H01L 23/04
257/E23.14
(Continued)

FOREIGN PATENT DOCUMENTS

CN 103125066 A 5/2013
EP 1 097 505 A2 5/2001
(Continued)

OTHER PUBLICATIONS

Machine translation JP59117459A.*
(Continued)

*Primary Examiner* — Kawing Chan
(74) *Attorney, Agent, or Firm* — Posz Law Group, PLC

(57) ABSTRACT

A backflow preventing device includes a backflow preventing element that is connected between a power supply and a load and that prevents electric current from flowing backward from the load side toward the power supply side, and a commutating device that performs a commutation
(Continued)

operation for causing the electric current to flow to a commutation path connected in parallel with the backflow preventing element. A plurality of elements including at least one or more of elements constituting the commutating device are configured as a module, so that, for example, the device can be reduced in size. Moreover, a simplified heat-dissipation design and a simplified air-duct design can be achieved.

13 Claims, 16 Drawing Sheets

(51) Int. Cl.
    F24F 7/007     (2006.01)
    F25B 31/02     (2006.01)
    H02M 1/34      (2007.01)
    H02P 27/06     (2006.01)
    H02M 1/00      (2006.01)
    H02M 1/42      (2007.01)
    H02M 7/00      (2006.01)

(52) U.S. Cl.
    CPC ............ *H02M 3/158* (2013.01); *H02P 27/06* (2013.01); *H02M 1/4225* (2013.01); *H02M 7/003* (2013.01); *H02M 2001/0051* (2013.01); *H02M 2001/342* (2013.01); *Y02B 70/126* (2013.01); *Y02B 70/1491* (2013.01)

(58) Field of Classification Search
    USPC ......................................................... 318/504
    See application file for complete search history.

(56) References Cited

U.S. PATENT DOCUMENTS

| | | | | |
|---|---|---|---|---|
| 5,874,826 | A | 2/1999 | Chen et al. | |
| 6,031,737 | A * | 2/2000 | Green | H02M 3/337 363/131 |
| 6,043,636 | A * | 3/2000 | Gaudreau | H02M 1/34 323/282 |
| 6,377,481 | B1 * | 4/2002 | Mantov | H02M 1/34 323/282 |
| 8,030,884 | B2 * | 10/2011 | King | H02J 1/10 307/45 |
| 9,531,250 | B2 * | 12/2016 | Arisawa | H02M 3/158 |
| 2001/0024374 | A1 | 9/2001 | Ben-Yaakov | |
| 2010/0265746 | A1 * | 10/2010 | Ishikawa | H03K 17/08128 363/131 |
| 2011/0018480 | A1 * | 1/2011 | Cheng | H02P 25/092 318/400.3 |
| 2011/0020720 | A1 * | 1/2011 | Chatroux | H02M 3/1584 429/431 |
| 2011/0132899 | A1 * | 6/2011 | Shimomugi | H02M 3/1584 219/620 |
| 2012/0206899 | A1 | 8/2012 | Takimoto et al. | |
| 2013/0152624 | A1 | 6/2013 | Arisawa et al. | |
| 2013/0334884 | A1 * | 12/2013 | Arisawa | H02M 3/158 307/43 |
| 2014/0111113 | A1 * | 4/2014 | Del Carmen, Jr. | H02M 3/158 315/297 |

FOREIGN PATENT DOCUMENTS

| | | | |
|---|---|---|---|
| EP | 2 490 334 A2 | 8/2012 | |
| JP | 59117459 A * | 7/1984 | ............ H02M 3/155 |
| JP | S62-176196 A | 8/1987 | |
| JP | 2005-160284 A | 6/2005 | |
| JP | 2009-060705 A | 3/2009 | |
| JP | 2011-045218 A | 3/2011 | |
| WO | 2012/042579 A1 | 4/2012 | |
| WO | 2012/104889 A1 | 8/2012 | |
| WO | 2012/120600 A1 | 9/2012 | |
| WO | 2012/137258 A1 | 10/2012 | |

OTHER PUBLICATIONS

Office Action dated Jun. 2, 2017 issued in corresponding CN application No. 2014800377754. (English translation attached).
International Search Report of the International Searching Authority dated Aug. 12, 2014 for the corresponding international application No. PCT/JP2014/067692 (and English translation).
Shigetoshi Yagihara et al., The Characteristic Evaluation of Recovery Assist Boost Chopper, SPC-13-5, Jan. 25, 2013, pp. 27-32 (English abstract attached).
Japanese Office Action of Jan. 10, 2017 in the corresponding JP application No. 2015-525263. (English translation attached).
Extended European Search Report of Jan. 30, 2017 in the corresponding EP application No. 14820605.5.
Erwin Bohmer, "3.2 Silizium Leistungsdioden" in " Elemente der angewandten Elektronik", Dec. 31, 2000, Vieweg & Sohn Veriagsgeseilschaft mbH, Braunschweig/Wiesbaden, 2000.
Office Action dated Dec. 5, 2017 issued in corresponding CN patent application No. 201480037775.4 (and English translation).
Office Action dated Feb. 8, 2018 issued in corresponding EP patent application No. 14820605.5.

* cited by examiner

BACKFLOW PREVENTING DEVICE, POWER CONVERSION APPARATUS, AND REFRIGERATING AND AIR-CONDITIONING APPARATUS

CROSS REFERENCE TO RELATED APPLICATION

This application is a U.S. national stage application of International Application No. PCT/JP2014/067692 filed on Jul. 2, 2014 and is based on International Application No. PCT/JP2013/068163 filed on Jul. 2, 2013, the disclosures of which are incorporated herein by reference.

TECHNICAL FIELD

The present invention relates to, for example, backflow preventing devices included in, for example, power conversion apparatuses.

BACKGROUND ART

Application fields of various kinds of power converting apparatuses have been studied in accordance with practical application of, for example, variable-voltage variable-frequency inverters.

For example, with regard to power converting apparatuses, the applied technology of buck-boost converters has been actively developed in recent years. Furthermore, for example, wide band-gap semiconductors composed of, for example, silicon carbide have also been actively developed. With regard to such new elements, elements that have high voltage resistant characteristics but have a small current-carrying capacity (i.e., a low permissible effective electric-current value) are put to practical use mainly as rectifiers (for example, see Patent Literature 1).

CITATION LIST

Patent Literature

Patent Literature 1: Japanese Unexamined Patent Application Publication No. 2005-160284 (FIG. 1)

SUMMARY OF INVENTION

Technical Problem

With regard to practical application of new highly-efficient elements, there are many problems for putting, for example, elements with a large electric-current capacity to practical use in terms of, for example, high costs and crystal defects. Thus, it is conceivable that it may take time for such elements to become popular. Therefore, at the present time, it is difficult to achieve increased efficiency by using the new elements in, for example, power conversion apparatuses that convert electric power higher than or equal to electric power to be supplied to, for example, motors for compressors in air-conditioning apparatuses.

In view of the problems described above, an object of the present invention is to provide, for example, a backflow preventing device that can ensure high efficiency, high reliability, and so on and that achieves further reduction of loss.

Solution to Problem

A backflow preventing device according to the present invention includes a backflow preventing element connected between a power supply and a load and configured to prevent electric current from flowing backward from a side of the load toward a side of the power supply, and a commutating device configured to perform a commutation operation for causing the electric current to flow to a commutation path connected in parallel with the backflow preventing element. A plurality of elements including at least one or more of elements constituting the commutating device are configured as a module.

Advantageous Effects of Invention

In the backflow preventing device according to the present invention, since the plurality of elements including at least one or more of the elements constituting the commutating device are configured as a module, for example, the device can be reduced in size. Moreover, a simplified heat-dissipation design and a simplified air-duct design can be achieved.

DESCRIPTION OF EMBODIMENTS

Figure 1:
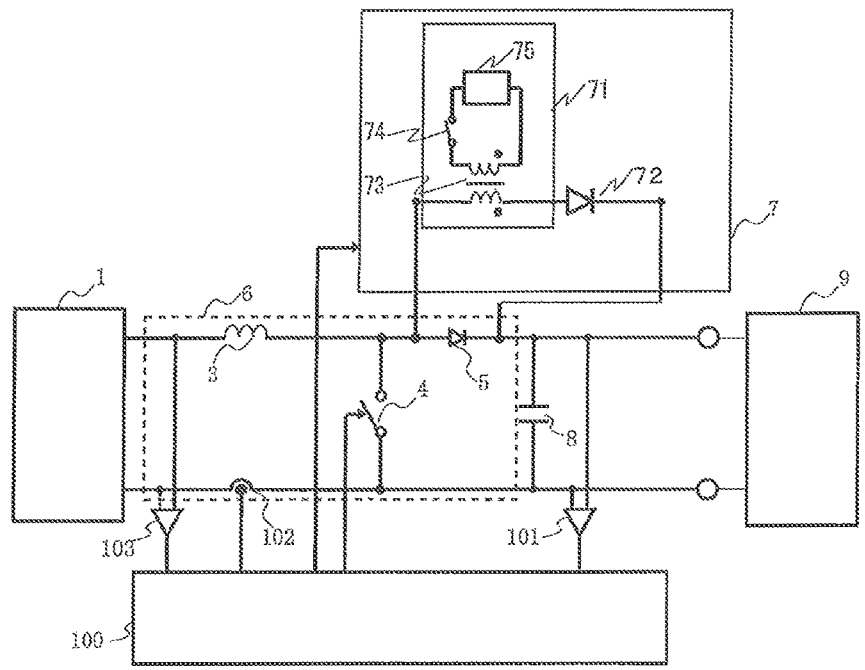
FIG. 1 illustrates an example of the configuration of, for example, a system centered on a power conversion apparatus according to Embodiment 1 of the present invention.

For example, a backflow preventing device according to each of Embodiment 1 to Embodiment 5 of the present invention will be described below with reference to the drawings. In the following drawings including FIG. 1, objects given the same reference signs are identical or equivalent objects and are common throughout the descriptions of Embodiment 1 to Embodiment 6 to be described below. The types of components described in the entire specification are exemplary and are not limited to the types described in the specification. In particular, combinations of components are not limited to the combinations specified in each of Embodiment 1 to Embodiment 6. Specifically, a component described in one Embodiment may be applied to another Embodiment. Furthermore, for example, with regard to the same type of devices that are differentiated from each other by suffixes, such devices may be described without the suffixes if it is not particularly necessary to differentiate them from each other or to specify them. Moreover, the dimensional relationships among components in the drawings may sometimes be different from those in actuality.

Embodiment 1

FIG. 1 illustrates an example of the configuration of, for example, a system centered on a power conversion apparatus according to Embodiment 1 of the present invention. First, the system configuration in FIG. 1 having the power conversion apparatus that can perform electric power conversion with high efficiency will be described.

In the system in FIG. 1, the power conversion apparatus is provided between a power supply 1 and a load 9 and converts electric power from the power supply 1 and supplies it to the load 9. The power conversion apparatus according to Embodiment 1 is configured to boost voltage and has, for example, a chopper circuit 6, a commutating device 7, and a smoothing device 8.

The power supply 1 is constituted of, for example, a combination of a direct-current power supply, an alternating-current power supply, and a rectifying circuit (i.e., a rectifier), and supplies direct-current power to the chopper circuit 6.

The chopper circuit 6 has a reactor 3, a boosting switch device 4, and a backflow preventing element 5. The reactor 3 is connected to the power supply 1 and is provided for suppressing higher harmonic waves. The boosting switch device 4 has a switching element, such as an IGBT (insulated gate bipolar transistor). The boosting switch device 4 short-circuits the power supply 1 (i.e., between two terminals connected to the power supply 1) via the reactor 3 based on a drive signal (i.e., a boosting drive signal) from a controller 100.

The backflow preventing element 5 is an element for preventing electric current from flowing backward from the smoothing device 8 in an area between the boosting switch device 4 and the smoothing device 8. Normally, the backflow preventing element 5 is, for example, a semiconductor element, such as a fast recovery diode, which has excellent electrical characteristics (i.e., recovery characteristics in particular) and has a small current-carrying capacity and a short reverse recovery time. The commutating device 7 is a device connected in parallel with the backflow preventing element 5. The commutating device 7 performs a commutation operation for commutating electric current flowing toward the backflow preventing element 5 to a different path (i.e., another path not intervened by the backflow preventing element 5, which will be referred to as "commutation path" hereinafter) at a required timing. The backflow preventing element 5 and the commutating device 7 serve as a backflow preventing device that prevents electric current from flowing backward from the load 9 side toward the power supply 1 side.

Figure 2:
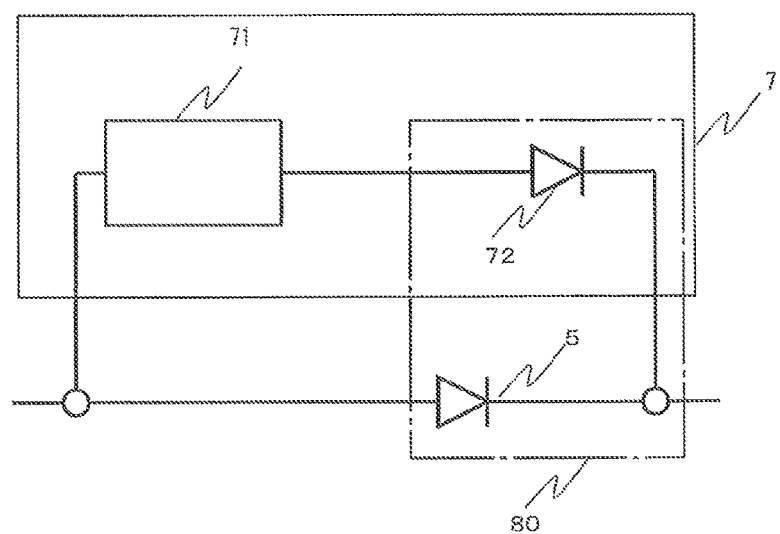
FIG. 2 illustrates an example in which a commutating device 7 is connected in parallel with a backflow preventing element 5, in accordance with Embodiment 1 of the present invention.

FIG. 2 illustrates an example in which the commutating device 7 is connected in parallel with the backflow preventing element 5, in accordance with Embodiment 1 of the present invention. The commutating device 7 is a device that performs a commutation operation for causing electric current to flow to the commutation path connected in parallel with the backflow preventing element 5. As shown in FIG. 2, the commutating device 7 according to Embodiment 1 has a commutation operation circuit (commutation operation unit) 71 and a commutation rectifying element 72.

As shown in FIG. 1, the commutation rectifying element 72 is connected in series with a secondary winding of a transformer 73 in the commutation path. The commutation rectifying element 72 prevents electric current from flowing backward from the load 9 side and makes the electric current flow from the power supply 1 side toward the load 9 side. The commutation rectifying element 72 is constituted of a semiconductor element, such as a fast recovery diode. Alternatively, a Schottky barrier diode, which has good recovery characteristics, low forward voltage, a low loss, and high voltage resistant characteristics, may be used as the commutation rectifying element 72. As another alternative, a wide-band gap semiconductor element composed of, for example, SiC (silicon carbide), GaN (gallium nitride), or diamond may be used. The use of these elements leads to an increase in crystal defects and an increase in costs as a permissible effective electric-current value becomes higher in the specifications thereof. Since an element with a low permissible effective electric-current value can be used as the commutation rectifying element 72 in Embodiment 1, a highly-efficient power conversion apparatus with a good cost-to-performance ratio can be achieved.

In particular, as shown in FIG. 2, in Embodiment 1, the backflow preventing element 5 and the commutation rectifying element 72 are configured as a module 80 and are disposed within the same module. By being configured as the module 80, the area of the entire device (circuit) can be reduced, as compared with a case where, for example, a discrete element and a printed substrate are configured separately. Moreover, it is not necessary to provide a heat sink in correspondence with each element. Therefore, the number of heat-dissipation countermeasure components can be reduced. Consequently, cost reduction can be achieved. For example, if commonality of a discrete element is to be achieved, a process for positionally aligning the holes of the heat sink and the element is necessary. However, since this process becomes unnecessary, the processing time can also be shortened. Furthermore, the grouping of the elements as the module 80 can contribute to a simplified air-duct design.

Furthermore, the commutation operation circuit 71 has the transformer 73, a commutation switch 74, and a commutation power supply 75. The transformer 73, which has, for example, a pulse transformer, applies voltage to a primary winding and causes excitation current to flow therethrough, thus inducing voltage to the secondary winding and causing electric current to flow therethrough. The transformer 73 also commutates electric current flowing through the chopper circuit 6 to the commutation path. The commutation power supply 75 supplies electric power to the transformer 73. The commutation switch 74 opens and closes based on a drive signal (i.e., a commutation drive signal) from the controller 100 and controls the electric power supply and the stoppage of the electric power supply to the transformer 73 (i.e., the primary winding).

With the intervention of the transformer 73 as described above, the commutation path and the circuit that connects the primary winding of the transformer 73, the commutation switch 74, and the commutation power supply 75 can be insulated from each other. Therefore, a signal for driving the commutating device 7 can be injected relatively easily. Moreover, a highly safe and reliable system can be established. Although FIG. 2 illustrates an example in which the secondary winding of the transformer 73 and the anode side of the commutation rectifying element 72 are connected to each other, the example is not limited to such connection if the direction of the electric current flowing through the commutation rectifying element 72 is the same. For example, the cathode side of the commutation rectifying element 72 and the secondary winding of the transformer 73 may be connected to each other. Furthermore, for example, a limiting resistor, a high-frequency capacitor, a snubber circuit, or a protection device may be inserted into the electric circuit constituted of the commutation power supply 75, the commutation switch 74, and the primary winding of the transformer 73, where necessary, in view of noise reduction and protection in the event of a failure. Furthermore, where necessary, a reset winding may be added to the primary winding of the transformer 73 so that excitation current can be reset. Moreover, by providing, for example, a rectifier, excitation energy may be regenerated at the power supply side so that increased efficiency can be achieved.

The smoothing device 8 is constituted of, for example, a capacitor, smooths voltage applied by the power supply 1, and performs electric power supply by applying direct-current voltage (i.e., output voltage, bus voltage) to the load 9. The load 9 is driven by the electric power supplied via the smoothing device 8.

A load voltage detector 101 is a voltage detector that detects the voltage smoothed by the smoothing device 8 and to be applied to the load 9 and outputs the detected voltage value in the form of a detection signal. An electric current detector 102 detects electric current (i.e., bus current) flowing from the power supply 1 and outputs the detected electric-current value in the form of a detection signal. Based on the detected electric-current value of the electric current detector 102, electric current flowing through the reactor 3 can also be detected. A power-supply voltage detector 103 is a voltage detector that detects voltage applied by the power supply 1 and outputs the detected voltage value in the form of a detection signal.

The controller 100 is a device that, for example, calculates the operation time (i.e., the short-circuit time) of the boosting switch device 4, the commutating device 7, or other devices from the detection-related signals from the load voltage detector 101, the electric current detector 102, and the power-supply voltage detector 103 and performs control. The controller 100 has, for example, arithmetic units, such as a microcomputer and a digital processor, and a converter that converts signals from the arithmetic units into drive signals for driving the boosting switch device 4 and the commutation switch 74. Since a plurality of commutation switches 74 are provided in Embodiment 1, a commutation drive signal corresponding to each commutation switch 74 is sent thereto.

The operation related to the system according to Embodiment 1 described above will be described below. The power conversion apparatus according to Embodiment 1 adds, for example, a commutation operation in the commutating device 7 to a power conversion operation of a DC chopper. Thus, the backflow preventing element 5 is reverse-recovered before electric current flows backward from the smoothing device 8, thereby reducing recovery electric current.

For example, when the operation is performed in a state where the boosting switch device 4 and the commutation switch 74 are turned off, the electric current path is established by the power supply 1, the reactor 3, the backflow preventing element 5, the load 9, and the power supply 1. When the operation is performed in a state where the boosting switch device 4 is turned on (i.e., closed) and the commutation switch 74 is turned off, the electric current path is established by the power supply 1, the reactor 3, the boosting switch device 4, and the power supply 1. In this case, the voltage applied to the reactor 3 is substantially equal to the voltage of the power supply 1. By repeating the on-off switching of the boosting switch device 4, the electric current paths can be alternated. Furthermore, by controlling the ratio of the on and off time periods, the waveform of input electric current by the power supply 1 can be arbitrarily changed, so that the power factor and the content percentage of higher harmonic current can be improved.

Normally, the number of accumulated carriers tends to increase as the current-carrying capacity of a rectifying diode increases. Therefore, the recovery electric current increases with increasing current-carrying capacity. Furthermore, the recovery electric current increases as the applied reverse bias voltage increases.

In the power conversion apparatus according to Embodiment 1, control (referred to as "commutation control" hereinafter) is performed by forming a commutation path with the commutating device 7 and performing reverse recovery by applying low reverse bias voltage via the transformer 73 and the commutation rectifying element 72 immediately before the boosting switch device 4 is turned on, instead of performing reverse recovery by applying high reverse bias voltage to the backflow preventing element 5, which has a large current-carrying capacity.

In commutation control, the commutation switch 74 of the commutating device 7 is turned on immediately before the boosting switch device 4 is turned on, and the electric current flowing toward the backflow preventing element 5 is commutated toward the commutation rectifying element 72 via the transformer 73. The electric current path in a state where the boosting switch device 4 is turned off and the commutation switch 74 is turned on is established by the power supply 1, the reactor 3, the backflow preventing element 5, the load 9, and the power supply 1. Furthermore, since the commutation switch 74 is turned on, the transformer 73 is excited, and the electric current also flows through the path established by the secondary winding of the transformer 73 and the commutation rectifying element 72 in the commutating device 7.

For example, a commutation drive signal for the commutating device 7 (i.e., the commutation switch 74) is set to an on-state immediately before a boosting drive signal for the boosting switch device 4 is set to an on-state. In this case, the electric current starts to flow toward the path of the secondary winding of the transformer 73 due to excitation current. Thus, the electric current flows distributively toward the backflow preventing element 5 and the commutation rectifying element 72. Subsequently, as the commutation drive signal is maintained in the on-state, the electric current no longer flows toward the backflow preventing element 5 after a certain time period, so that the entire electric current flows toward the commutation rectifying element 72 (i.e., the commutation is completed).

When performing the commutation operation, the commutation power supply 75 is set to a sufficiently low value, as compared with the output voltage of the smoothing device 8, so that the backflow preventing element 5 can be turned off (i.e., reverse-recovered) with low reverse bias voltage. When the boosting switch device 4 is turned on in this state, a reverse recovery operation of the commutation rectifying element 72 is performed. In this case, recovery electric current is generated. However, since the electric-current flowing time in the commutation rectifying element 72 is extremely short, as compared with that in the backflow preventing element 5, the effective electric current of the electric current flowing through the commutation rectifying element 72 is low, meaning that the current-carrying capacity required therein may be small. Thus, a small-capacity element with a small number of accumulated carriers can be used, thereby allowing for reduction of recovery electric current, as compared with a case where recovery electric current is generated by the backflow preventing element 5 (in this case, the element is selected in view of the peak electric current). As a result, a loss and an amount of noise resulting from recovery electric current can be reduced in the overall system. Consequently, the levels of noise terminal voltage, radiation noise, and so on are reduced, and a circuit loss is suppressed. Thus, a noise filter can be reduced in size, and cost reduction can be achieved.

Figure 3:
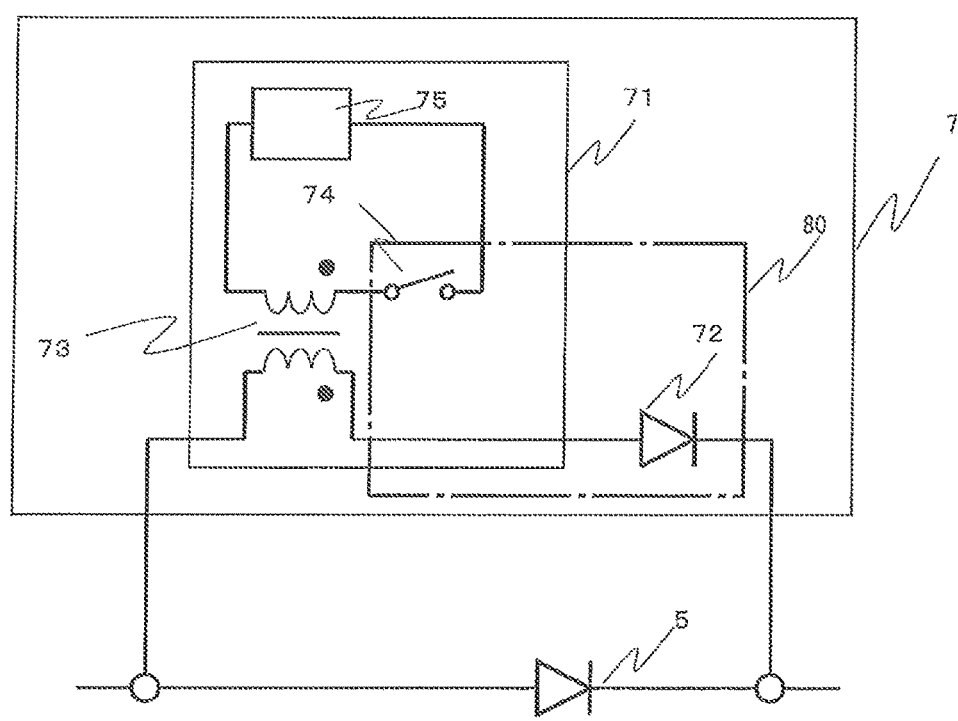
FIG. 3 illustrates another example (1) of a module configuration according to Embodiment 1 of the present invention.

FIG. 3 illustrates another example of the module configuration according to Embodiment 1 of the present invention. For example, although the backflow preventing element 5 and the commutation rectifying element 72 are configured as the module 80 in FIG. 2, the commutation rectifying element 72 and the commutation switch 74 are configured within the same module 80 in FIG. 3.

Figure 4:
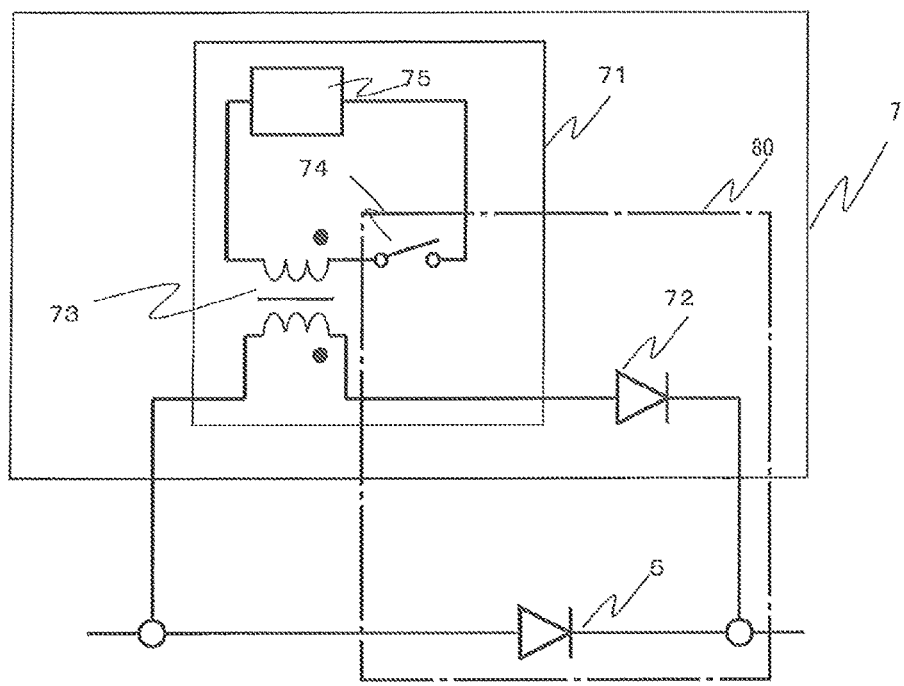
FIG. 4 illustrates another example (2) of the module configuration according to Embodiment 1 of the present invention.

FIG. 4 illustrates another example of the module configuration according to Embodiment 1 of the present invention. For example, although the backflow preventing element 5 and the commutation rectifying element 72 are configured as the module 80 in FIG. 2, the commutation switch 74 is further included within the same module 80 in FIG. 4. In a case where an element disposed within the module 80 is to be connected to another element within the module 80, the terminals thereof are connected to each other within the module 80. Thus, the number of terminals in the module 80 can be reduced.

Accordingly, in Embodiment 1, the backflow preventing element 5 and the commutation rectifying element 72 are configured as the module 80 and are disposed within the same module so that they do not need to be disposed on, for example, a printed substrate, thereby reducing the area of the entire device (circuit).

Furthermore, the number of steps for forming a printed substrate can be reduced. Moreover, it is not necessary to provide, for example, a heat sink in correspondence with each element, and the number of heat-dissipation countermeasure components can be reduced. Consequently, cost reduction can be achieved. Furthermore, since the temperature conditions for the elements within the module 80 can be regarded as being the same, the grouping of the elements as the module 80 can contribute to a simplified air-duct design as well as a simplified heat-dissipation design.

Furthermore, with the module 80, for example, a reverse recovery operation performed when reverse voltage is applied to the commutation rectifying element 72 or the backflow preventing element 5 in a state where forward electric current is flowing therethrough can be simulated as a capacitance component of the commutation rectifying element 72 or the backflow preventing element 5. In order to reduce the recovery electric current during the reverse recovery operation, this capacitance component is preferably small. In particular, an ability to reduce the capacitance component of the commutation rectifying element greatly contributes to reduction of the recovery electric current. A capacitance component C between conductors can be expressed as $C=\varepsilon \times S/d$ by using a conductor-to-conductor distance d, a conductor area S, and a dielectric constant $\varepsilon$. Therefore, by reducing the conductor area S or increasing the conductor-to-conductor distance d, the capacitance component C can be reduced. However, increasing the conductor-to-conductor distance d has a trade-off relationship with circuit integration as well as reduction of wiring impedance. Moreover, in a case of an application to a device that deals with high voltage, a large insulation distance needs to be ensured. Therefore, it is difficult to increase the conductor-to-conductor distance d in a required region. In Embodiment 1, the commutation rectifying element 72 is disposed within the module 80, and the wires and the patterns near the element are reduced in area so that the capacitance component of the commutation rectifying element 72 is reduced, thereby further reducing the recovery electric current. Furthermore, the terminals of the elements within the module 80 are connected to each other within the module 80 so that the number of terminals in the module 80 can be reduced. Therefore, for example, the pattern area in the device can be reduced. For example, when elements in a path of a power device system in which large electric current flows are configured as the module 80, the advantage thereof can be further enhanced by reducing the number of terminals in the module 80. When manufacturing, for example, the device, a soldering process is sometimes performed by discharging solder partially to each terminal of the module 80 instead of performing the soldering process simultaneously with a soldering process for chip components in the module 80. In this case, when discharging the solder, for example, a countermeasure is taken in advance, such as ensuring a region where other components are not mounted near the terminals of the module 80, to prevent the solder from adhering to other components. This is problematic in that the substrate area increases. Because the number of terminals in the module 80 is reduced, as described above, the region where the other components are prohibited from being mounted can be reduced, thereby suppressing an increase in substrate area.

Embodiment 2

Figure 5:
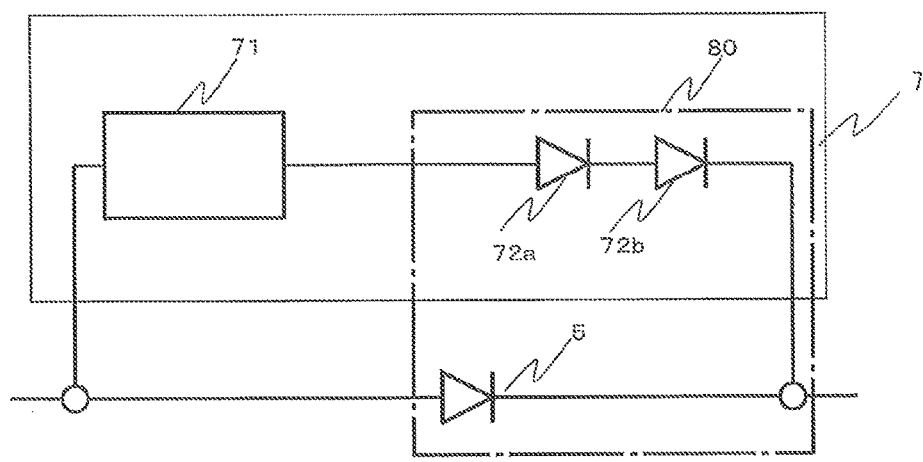
FIG. 5 illustrates an example in which the commutating device 7 is connected in parallel with the backflow preventing element 5, in accordance with Embodiment 2 of the present invention.

FIG. 5 illustrates an example in which the commutating device 7 is connected in parallel with the backflow preventing element 5, in accordance with Embodiment 2 of the present invention. In Embodiment 2, a plurality of commutation rectifying elements 72 are connected in series.

For example, in the commutation path, the commutation rectifying elements 72 can be regarded as capacitance components. Therefore, the total capacitance component obtained by connecting a plurality of commutation rectifying elements 72 in series is normally smaller than a capacitance component constituted of a single commutation rectifying element 72. Therefore, for example, even if each commutation rectifying element 72 does not have good reverse recovery characteristics, the recovery electric current can ultimately be suppressed more effectively by connecting a plurality of commutation rectifying elements 72 in series than using a single commutation rectifying element 72 having good reverse recovery characteristics. In Embodiment 2, the plurality of commutation rectifying elements 72 connected in series are configured as the module 80.

Figure 6:
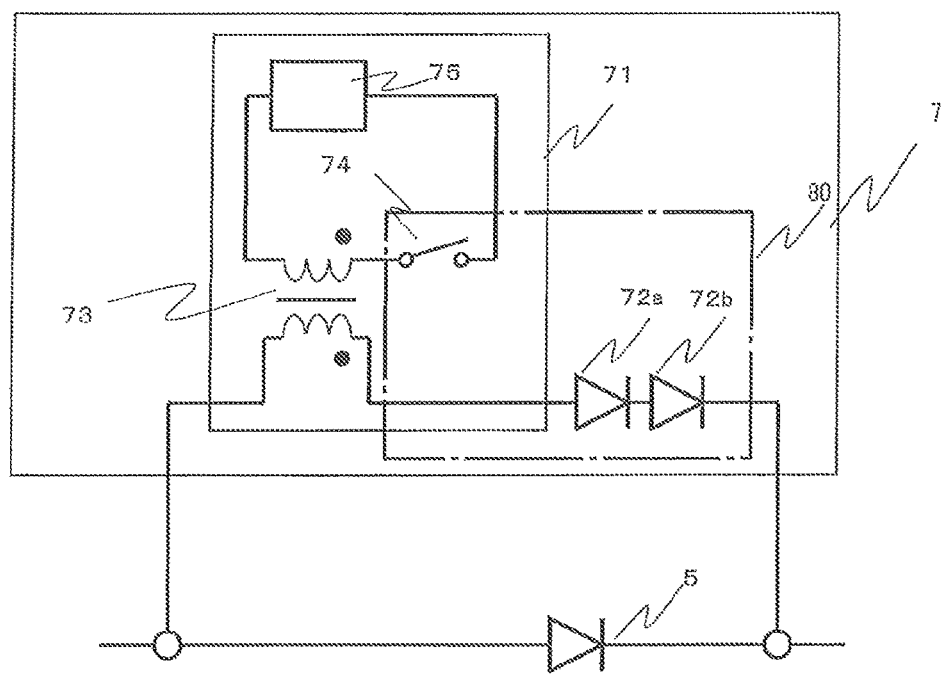
FIG. 6 illustrates another example (1) of a module configuration according to Embodiment 2 of the present invention.

FIG. 6 illustrates another example of the module configuration according to Embodiment 2 of the present invention. For example, although the backflow preventing element 5 and the plurality of commutation rectifying elements 72 are configured as the module 80 in FIG. 5, the plurality of commutation rectifying elements 72 and the commutation switch 74 are configured within the same module 80 in FIG. 6.

Figure 7:
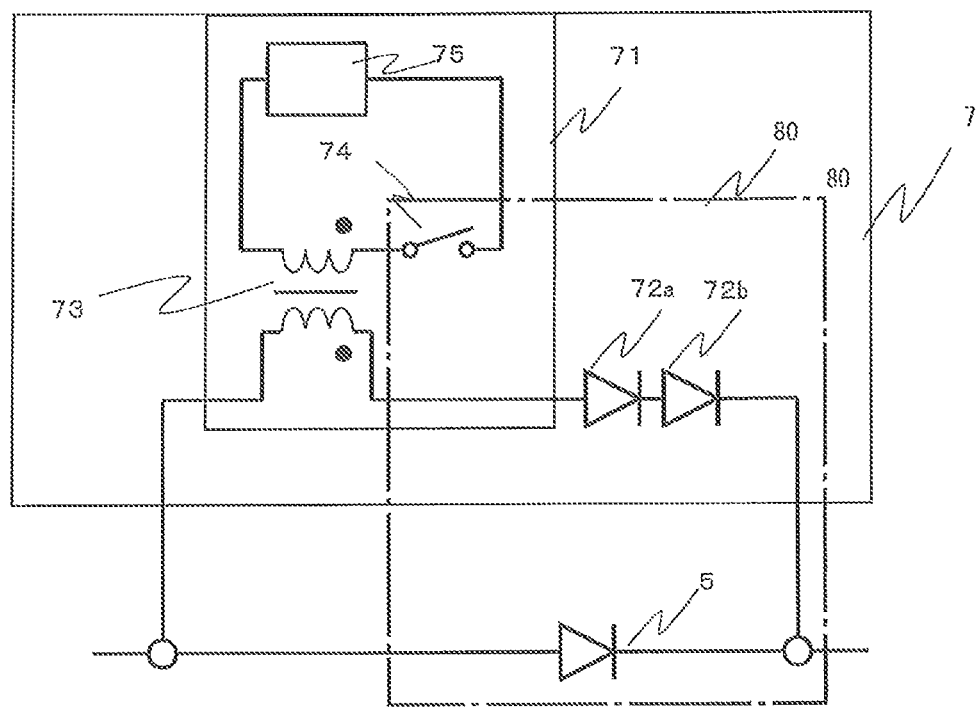
FIG. 7 illustrates another example (2) of the module configuration according to Embodiment 2 of the present invention.

FIG. 7 illustrates another example of the module configuration according to Embodiment 2 of the present invention. For example, although the backflow preventing element 5 and the plurality of commutation rectifying elements 72 are configured as the module 80 in FIG. 5, the commutation switch 74 is further included within the same module 80 in FIG. 7.

Even in the case where the module 80 is configured by connecting the plurality of commutation rectifying elements 72 in series, as in Embodiment 2, advantages similar to those of Embodiment 1 are exhibited. In particular, since the temperature conditions are the same for the commutation rectifying elements 72, there is no variation between the elements.

Embodiment 3

Figure 8:
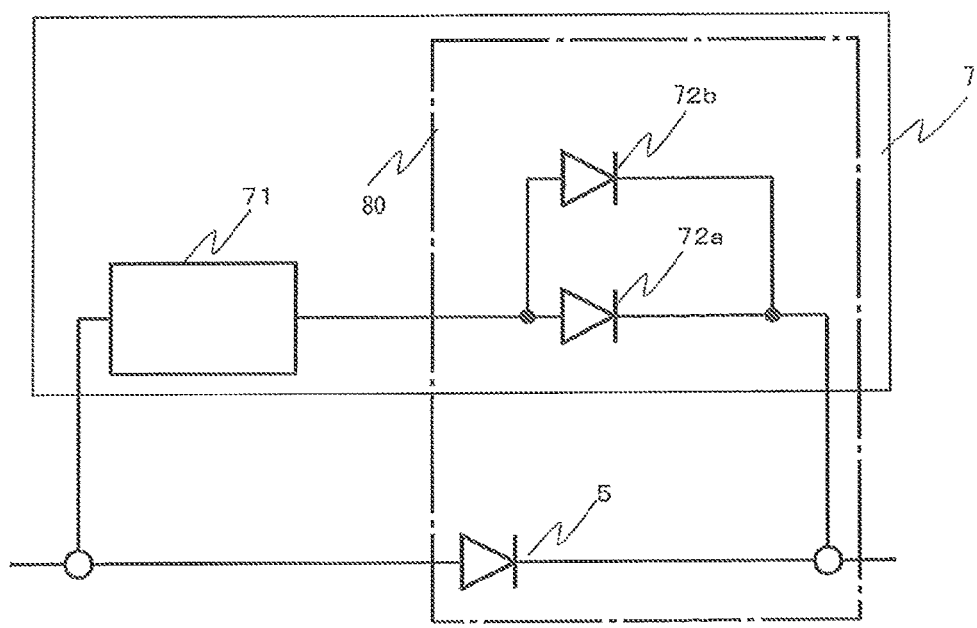
FIG. 8 illustrates an example in which the commutating device 7 is connected in parallel with the backflow preventing element 5, in accordance with Embodiment 3 of the present invention.

FIG. 8 illustrates an example in which the commutating device 7 is connected in parallel with the backflow preventing element 5, in accordance with Embodiment 3 of the present invention. In contrast to Embodiment 2 described above in which the plurality of commutation rectifying elements 72 are connected in series, the plurality of commutation rectifying elements 72 are connected in parallel, and the backflow preventing element 5 and the plurality of commutation rectifying elements 72 are configured as the module 80 in Embodiment 3. With the plurality of commutation rectifying elements 72 connected in parallel, the amount of electric current flowing to each commutation rectifying element 72 is reduced. Therefore, an element with a small current-carrying capacity can be selected as each commutation rectifying element 72. Thus, the selection range of materials can be increased when configuring the commutating device. In this case, for example, cost reduction can be achieved by selecting the material based on costs.

Figure 9:
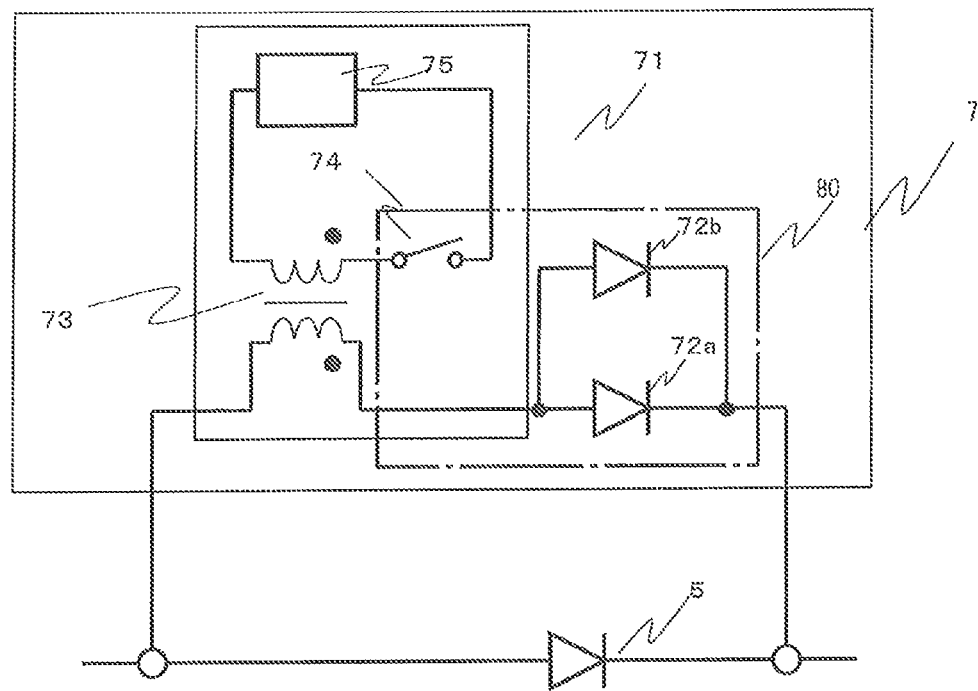
FIG. 9 illustrates another example (1) of a module configuration according to Embodiment 3 of the present invention.

FIG. 9 illustrates another example of the module configuration according to Embodiment 3 of the present invention. For example, although the backflow preventing element 5 and the plurality of commutation rectifying elements 72 are configured as the module 80 in FIG. 8, the plurality of commutation rectifying elements 72 and the commutation switch 74 are configured within the same module 80 in FIG. 9.

Figure 10:
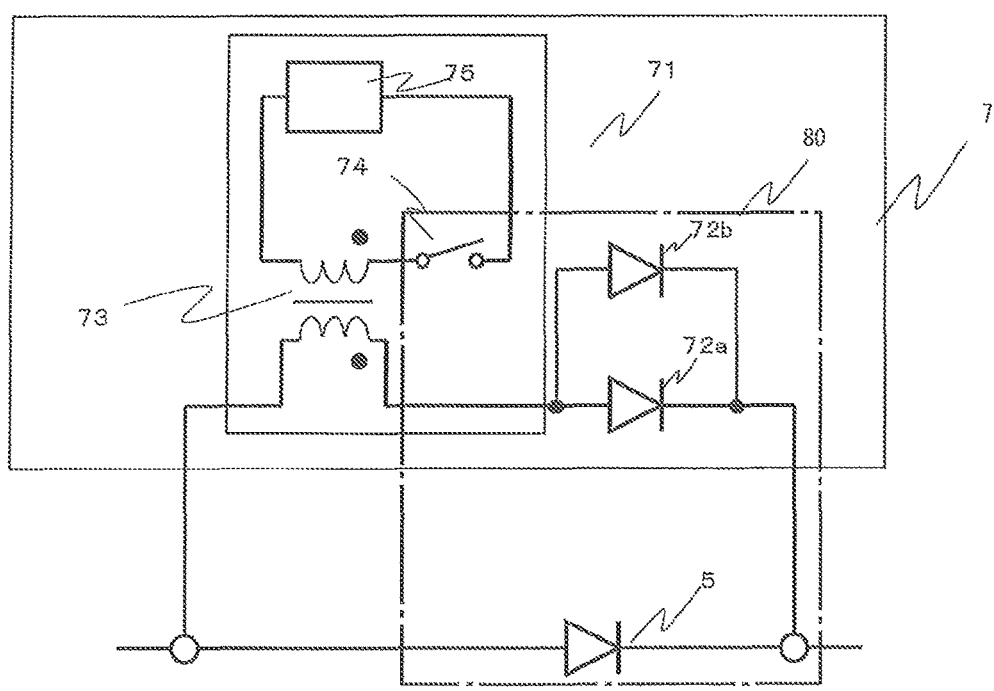
FIG. 10 illustrates another example (2) of the module configuration according to Embodiment 3 of the present invention.

FIG. 10 illustrates another example of the module configuration according to Embodiment 3 of the present invention. For example, although the backflow preventing element 5 and the plurality of commutation rectifying elements 72 are configured as the module 80 in FIG. 8, the commutation switch 74 is further included within the same module 80 in FIG. 10.

Figure 11:
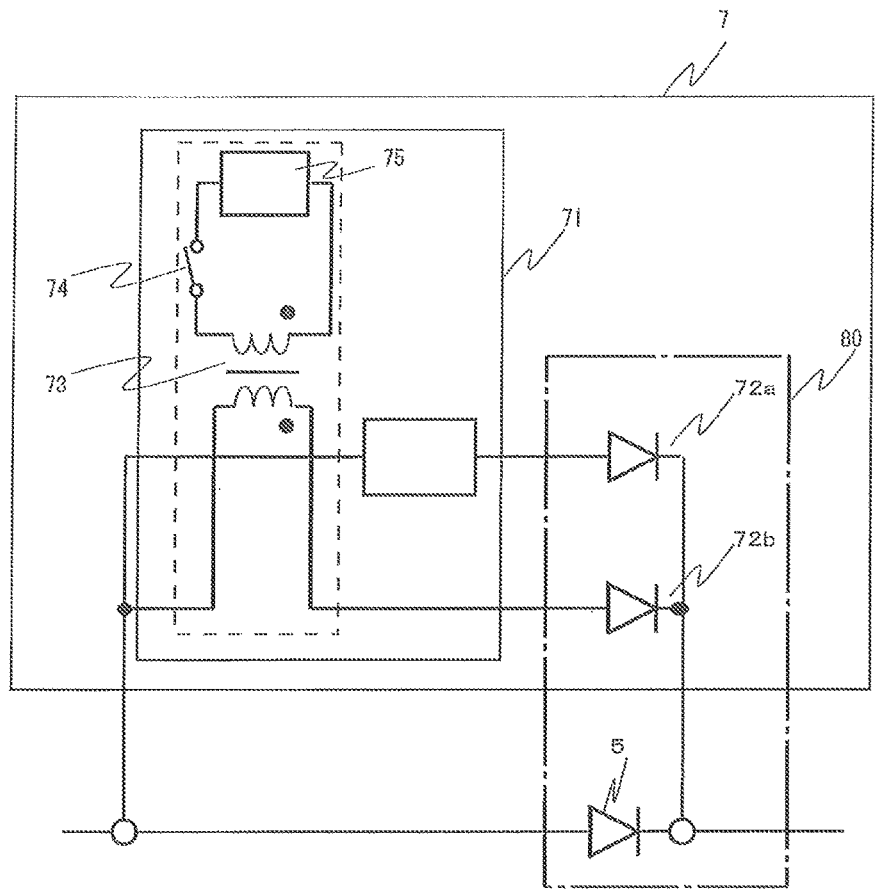
FIG. 11 illustrates another example (3) of the module configuration according to Embodiment 3 of the present invention.

FIG. 11 illustrates another example of the module configuration according to Embodiment 3 of the present invention. For example, although being substantially a single path in FIG. 8, the commutation path has two paths in FIG. 11. Moreover, the commutation operation circuit 71 has a set of the transformer 73, the commutation switch 74, and the commutation power supply 75 for each commutation path. Therefore, electric current can be made to flow through each commutation path at an independent timing. Although the backflow preventing element 5 and the plurality of commutation rectifying elements 72 are configured as the module 80 in FIG. 11, each commutation switch 74 may be further included therein.

Even in the case where the module is configured by connecting the plurality of commutation rectifying elements 72 in series, as in Embodiment 3, advantages similar to those of Embodiment 1 and Embodiment 2 are exhibited.

Embodiment 4

Figure 12:
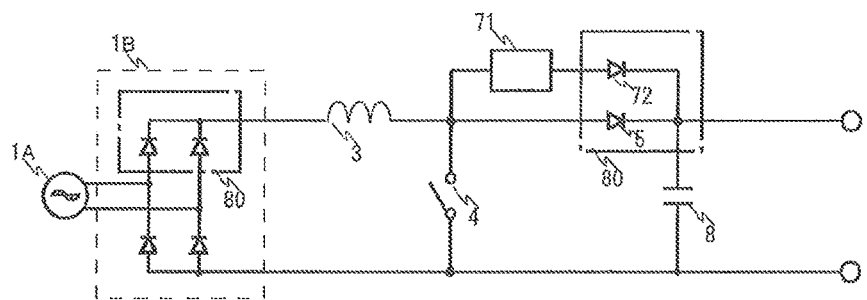
FIG. 12 illustrates a part of the configuration of a system centered on a power conversion apparatus according to Embodiment 4 of the present invention.

FIG. 12 illustrates a part of the configuration of a system centered on a power conversion apparatus according to Embodiment 4 of the present invention. In FIG. 12, devices and so on that are given the same reference signs as those in, for example, FIG. 1 perform similar operations as those described in, for example, Embodiment 1. In FIG. 12, the power supply 1 provided is constituted of, for example, a combination of an alternating-current power supply 1A and a rectifying circuit (rectifier) 1B. The rectifying circuit 1B constitutes a diode bridge by combining four diodes (i.e., rectifying elements).

For example, in Embodiment 1, the backflow preventing element 5 and the commutation rectifying element 72, which have a parallel-connected relationship, constitute the module 80, as illustrated in, for example, FIG. 2. The rectifying circuit 1B has two sets of diodes, which have a parallel-connected relationship. Therefore, the module 80 can be used when configuring the rectifying circuit 1B. In this case, the module 80 is used as the set connected to the positive side of the alternating-current power supply 1A.

Figure 13:
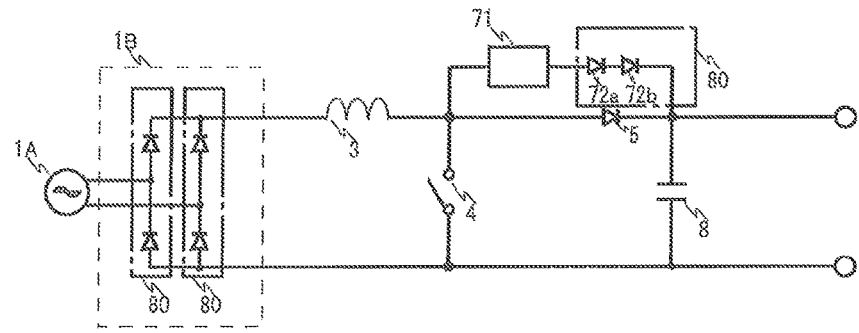
FIG. 13 illustrates another example (1) of the system configuration centered on the power conversion apparatus according to Embodiment 4 of the present invention.

FIG. 13 illustrates another example of the system configuration centered on the power conversion apparatus according to Embodiment 4 of the present invention. In FIG. 13, the module 80 including the plurality of commutation rectifying elements 72 having the series-connected relationship in Embodiment 2 is used. The rectifying circuit 1B has two sets of diodes having a series-connected relationship. Therefore, the module 80 including the plurality of commutation rectifying elements 72 having the series-connected relationship can also be used when configuring the rectifying circuit 1B.

Figure 14:
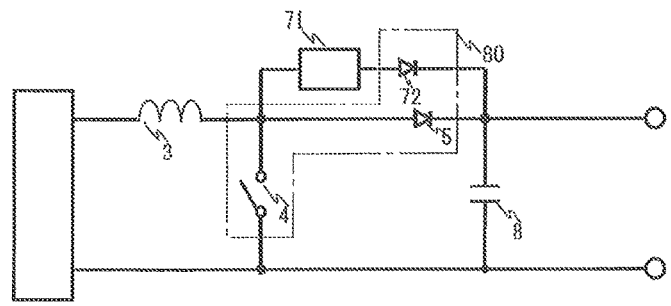
FIG. 14 illustrates another example (2) of the system configuration centered on the power conversion apparatus according to Embodiment 4 of the present invention.

FIG. 14 illustrates another example of the system configuration centered on the power conversion apparatus according to Embodiment 4 of the present invention. For example, in Embodiment 1 described above, the backflow preventing element 5, the commutation rectifying element 72, and the commutation switch 74 constitute the module 80. In FIG. 14, the backflow preventing element 5, the commutation rectifying element 72, and the boosting switch device 4 constitute the module 80.

Figure 15:
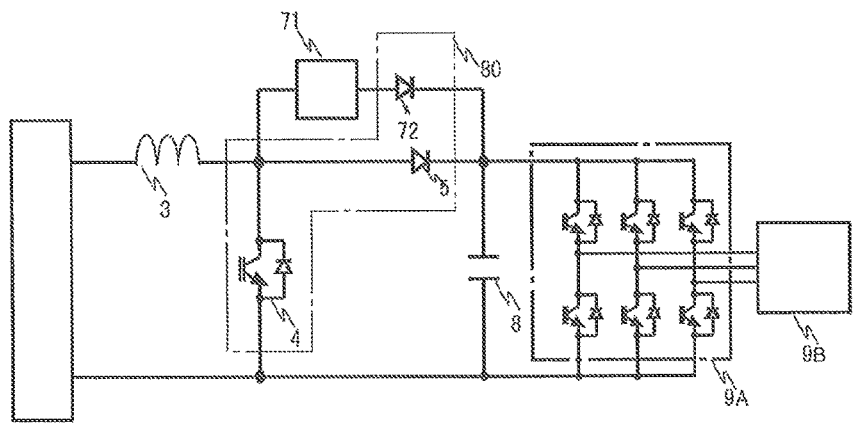
FIG. 15 illustrates another example) of the system configuration centered on the power conversion apparatus according to Embodiment 4 of the present invention.
Figure 16:
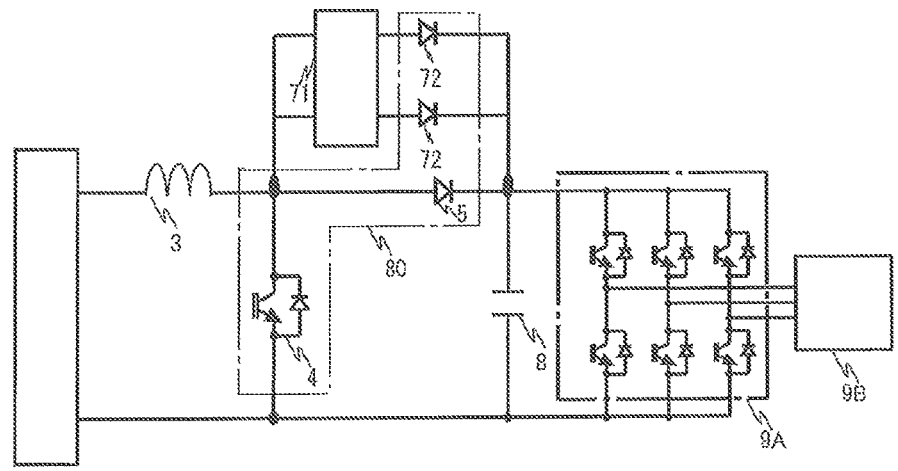
FIG. 16 illustrates another example 4) of the system configuration centered on the power conversion apparatus according to Embodiment 4 of the present invention.
Figure 17:
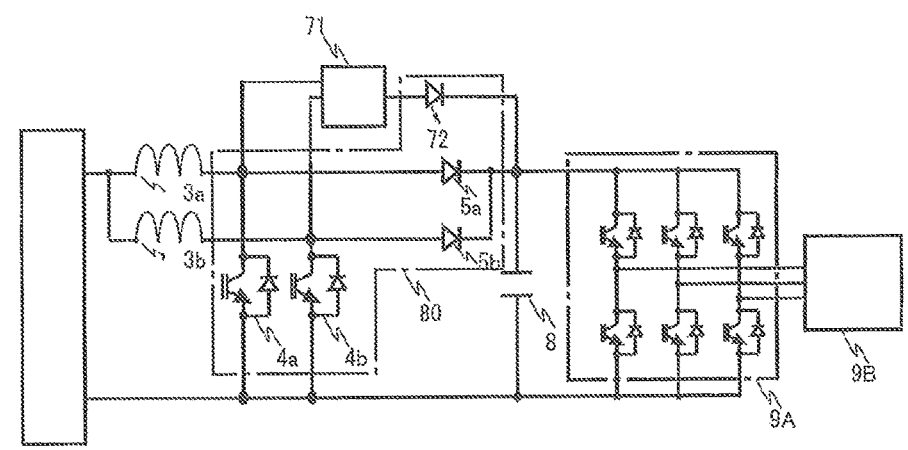
FIG. 17 illustrates another example (5) of the system configuration centered on the power conversion apparatus according to Embodiment 4 of the present invention.
Figure 18:
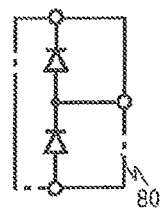
FIG. 18 illustrates a connection example (1) of a module 80 according to Embodiment 5 of the present invention.
Figure 19:
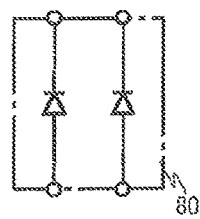
FIG. 19 illustrates a connection example (2) of the module 80 according to Embodiment 5 of the present invention.
Figure 20:
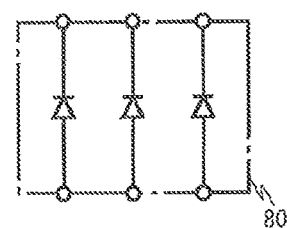
FIG. 20 illustrates a connection example (3) of the module 80 according to Embodiment 5 of the present invention.
Figure 21:
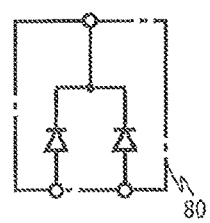
FIG. 21 illustrates a connection example (4) of the module 80 according to Embodiment 5 of the present invention.
Figure 22:
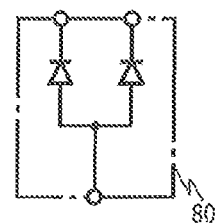
FIG. 22 illustrates a connection example (5) of the module 80 according to Embodiment 5 of the present invention.
Figure 23:
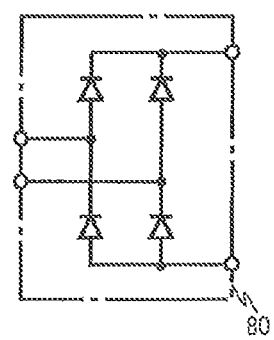
FIG. 23 illustrates a connection example (6) of the module 80 according to Embodiment 5 of the present invention.
Figure 24:
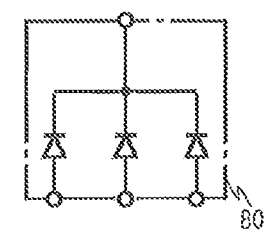
FIG. 24 illustrates a connection example (7) of the module 80 according to Embodiment 5 of the present invention.
Figure 25:
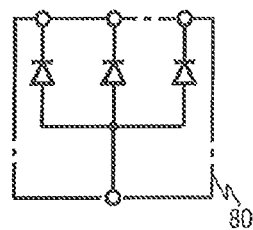
FIG. 25 illustrates a connection example (8) of the module 80 according to Embodiment 5 of the present invention.
Figure 26:
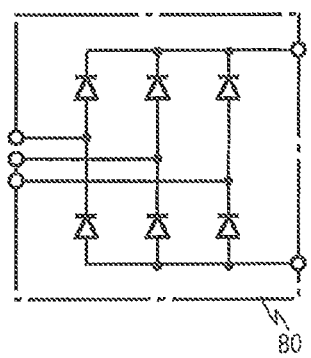
FIG. 26 illustrates a connection example (9) of the module 80 according to Embodiment 5 of the present invention.
Figure 27:
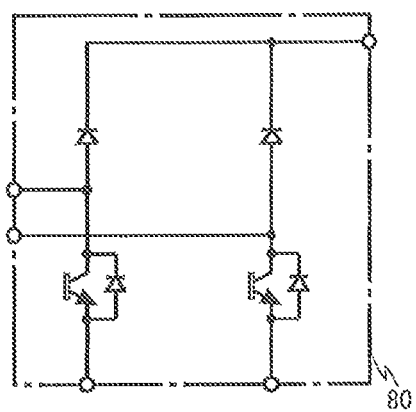
FIG. 27 illustrates a connection example (10) of the module 80 according to Embodiment 5 of the present invention.
Figure 28:
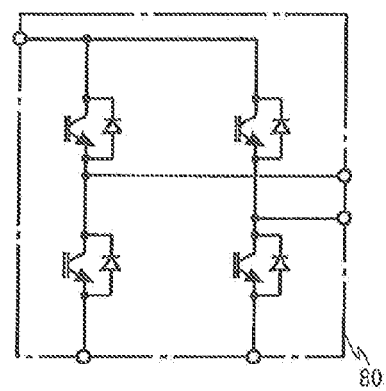
FIG. 28 illustrates a connection example (11) of the module 80 according to Embodiment 5 of the present invention.
Figure 29:
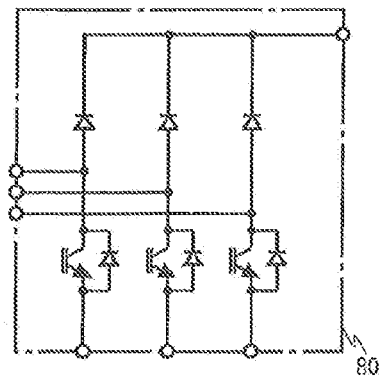
FIG. 29 illustrates a connection example (12) of the module 80 according to Embodiment 5 of the present invention.
Figure 30:
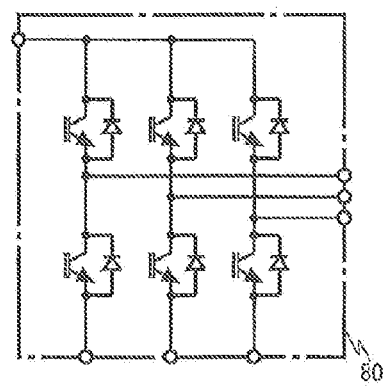
FIG. 30 illustrates a connection example (13) of the module 80 according to Embodiment 5 of the present invention.

FIGS. 15 to 17 illustrate other examples of the system configuration centered on the power conversion apparatus according to Embodiment 4 of the present invention. In FIGS. 15 to 17, the load 9 provided is constituted of, for example, a combination of an inverter 9A and an alternating-current load 9B, such as a motor. For example, in FIG. 14, the backflow preventing element 5, the commutation rectifying element 72, and the boosting switch device 4 constitute the module 80.

The inverter 9A has a plurality of sets of a combination of a switching element and a reflux diode connected in inverse-parallel with the switching element. Therefore, the module 80 can be used when configuring the inverter 9A.

Accordingly, the module 80 used as a backflow preventing device is also used when configuring a power conversion circuit or an element within the system, so that the overall cost of the apparatus or the system can be reduced. For example, by configuring the inverter 9A as the module 80, the length of wiring between elements can be reduced, so that inductor components can be reduced, thereby also allowing for, for example, higher harmonic switching. Furthermore, with the module 80, the area (i.e., volume) of the entire circuit can be reduced.

Embodiment 5

FIGS. 18 to 30 illustrate connection examples of the module 80 according to Embodiment 5 of the present invention. Terminals can be formed by performing wiring between elements within the module 80 as shown in each of the drawings.

Embodiment 6

Figure 31:
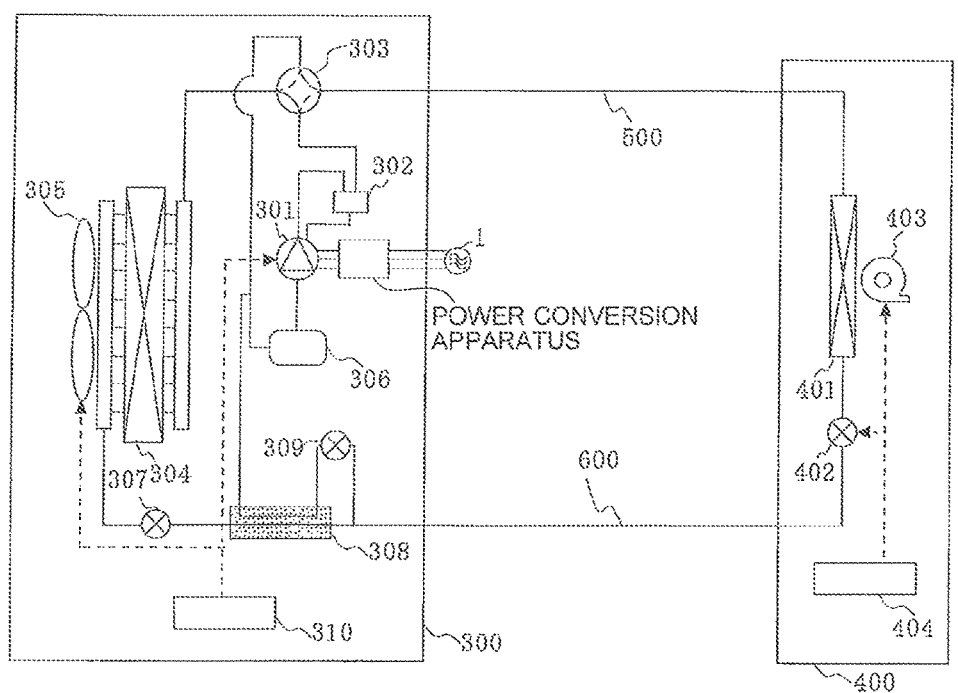
FIG. 31 illustrates the configuration of a refrigerating and air-conditioning apparatus according to Embodiment 6 of the present invention.

FIG. 31 illustrates the configuration of a refrigerating and air-conditioning apparatus according to Embodiment 6 of the present invention. The following description of Embodiment 6 relates to a refrigerating and air-conditioning apparatus in which electric power is supplied via the above-described power conversion apparatus. The refrigerating and air-conditioning apparatus in FIG. 31 includes a heat-source-side unit (i.e., an outdoor unit) 300 and a load-side unit (i.e., an indoor unit) 400, which are connected by refrigerant pipes to constitute a main refrigerant circuit (referred to as "main refrigerant circuit" hereinafter) through which refrigerant circulates. The refrigerant pipes include a gas pipe 500 through which gaseous refrigerant (i.e., gas refrigerant) flows and a liquid pipe 600 through which liquid refrigerant (i.e., liquid refrigerant but may sometimes be two-phase gas-liquid refrigerant) flows.

In Embodiment 6, the heat-source-side unit 300 is constituted of various units (means), which include a compressor 301, an oil separator 302, a four-way valve 303, a heat-source-side heat exchanger 304, a heat-source-side fan 305, an accumulator 306, a heat-source-side expansion unit (i.e., an expansion valve) 307, a heat exchanger 308 related to refrigerant, a bypass expansion unit 309, and a heat-source-side controller 310.

The compressor 301 compresses and discharges suctioned refrigerant. The compressor 301 has an inverter that can finely adjust the capacity (i.e., the amount of refrigerant to be discharged per unit time) of the compressor 301 by arbitrarily changing the operating frequency. The power conversion apparatus described in any one of Embodiment 1 to Embodiment 5 described above is attached between, for example, the power supply 1, which supplies electric power for driving the compressor 301 (i.e., a motor), and the compressor 301 having the inverter serving as the load 9. A device constituted of a combination of the power conversion apparatus and the inverter serves as a motor driver.

The oil separator 302 separates lubricating oil mixed in the refrigerant and discharged from the compressor 301. The separated lubricating oil is returned to the compressor 301. The four-way valve 303 changes the flow of the refrigerant in accordance with a cooling operation mode and a heating operation mode based on a command from the heat-source-side controller 10. The heat-source-side heat exchanger 304 exchanges heat between the refrigerant and air (i.e., outdoor air). During heating operation, the heat-source-side heat exchanger 304 functions as an evaporator and exchanges heat between the air and low-pressure refrigerant flowing in via the heat-source-side expansion unit 307, thereby evaporating and gasifying the refrigerant. During cooling operation, the heat-source-side heat exchanger 304 functions as a condenser and exchanges heat between the air and the refrigerant flowing in from the four-way valve 303 side and compressed the compressor 301, thereby condensing and liquefying the refrigerant. In order to efficiently exchange heat between the refrigerant and the air, the heat-source-side heat exchanger 304 is provided with the heat-source-side fan 305. With regard to the heat-source-side fan 305, the rotation speed of the fan may be finely adjusted by supplying electric power thereto via the power conversion apparatus according to any one of Embodiment 1 to Embodiment 5 described above and, for example, arbitrarily changing the operating frequency of the fan motor in the inverter serving as the load 9.

The heat exchanger 308 related to refrigerant exchanges heat between refrigerant flowing through a main flow path of the refrigerant circuit and refrigerant that has diverged from that flow path and whose flow rate has been adjusted by the bypass expansion unit 309 (i.e., an expansion valve). In particular, when the refrigerant needs to be subcooled during cooling operation, the refrigerant heat exchanger 308 subcools the refrigerant and supplies the refrigerant to the load-side unit 400. The liquid flowing via the bypass expansion unit 309 is returned to the accumulator 306 via a bypass pipe. The accumulator 306 is, for example, means for storing excess liquid refrigerant. The heat-source-side controller 310 is formed of, for example, a microcomputer. The heat-source-side controller 310 is capable of communicating with a load-side controller 404 in a wired or wireless manner. For example, based on data related to detection by various types of detecting means (i.e., sensors) within the refrigerating and air-conditioning apparatus, the heat-source-side controller 310 controls the overall operation of the refrigerating and air-conditioning apparatus by controlling each means related to the refrigerating and air-conditioning apparatus, such as by controlling the operating frequency of the compressor 301 by controlling an inverter circuit. Furthermore, the processing performed by the controller 100 described in each of Embodiment 1 to Embodiment 5 may be performed by the heat-source-side controller 310.

The load-side unit 400 is constituted of a load-side heat exchanger 401, a load-side expansion unit (i.e., an expansion valve) 402, a load-side fan 403, and the load-side controller 404. The load-side heat exchanger 401 exchanges heat between refrigerant and air. For example, during heating operation, the load-side heat exchanger 401 functions as a condenser and exchanges heat between the air and refrigerant flowing in from the gas pipe 500 to condense and liquefy the refrigerant (or to change the refrigerant into a two-phase gas-liquid state), and discharges the refrigerant toward the liquid pipe 600. During cooling operation, the load-side heat exchanger 401 functions as an evaporator and exchanges heat between the air and refrigerant changed into a low-pressure state by the load-side expansion unit 402 to evaporate and gasify the refrigerant by making the refrigerant receive heat from the air, and discharges the refrigerant toward the gas pipe 500. Furthermore, the load-side unit 400 is provided with the load-side fan 403 for adjusting the flow of air that is to exchange heat with the refrigerant. The operating speed of the load-side fan 403 is set by, for example, a user. The load-side expansion unit 402 is provided for adjusting the pressure of the refrigerant within the load-side heat exchanger 401 by changing the opening degree of the load-side expansion unit 402.

The load-side controller 404 is also formed of, for example, a microcomputer and is capable of communicating with, for example, the heat-source-side controller 310 in a wired or wireless manner. Based on a command from the heat-source-side controller 310 or a command from, for example, a resident, each unit (i.e., means) in the load-side unit 400 is controlled such that, for example, the indoor temperature is set to a predetermined temperature. Furthermore, a signal that contains data related to detection by detecting means provided in the load-side unit 400 is transmitted.

Accordingly, in the refrigerating and air-conditioning apparatus according to Embodiment 6, electric power is supplied to, for example, the compressor 301 and the heat-source-side fan 305 by using the power conversion apparatus according to any one of Embodiment 1 to Embodiment 5 described above, whereby a highly-efficient, highly-reliable refrigerating and air-conditioning apparatus can be obtained.

INDUSTRIAL APPLICABILITY

Although Embodiment 6 described above is directed to a case where the power conversion apparatus according to the present invention is applied to the refrigerating and air-conditioning apparatus, the present invention is not limited to the above. The power conversion apparatus according to the present invention may also be applied to, for example, a heat pump apparatus, an apparatus that utilizes a refrigeration cycle (i.e., a heat pump cycle), such as a refrigerator, a transport apparatus, such as an elevator, or an illuminator (system). In that case, similar advantages can be exhibited.

REFERENCE SIGNS LIST 1 power supply 1A alternating-current power supply 1B rectifying circuit 3 reactor 4 boosting switch device 5 backflow preventing element 6 chopper circuit 7 commutating device 8 smoothing device 9 load 9A inverter 9B alternating-current load commutation operation circuit 72 commutation rectifying element transformer 74 commutation switch 75 commutation power supply 80 module 100 controller 101 load voltage detector 102 electric current detector 103 power-supply voltage detector 300 heat-source-side unit 301 compressor 302 oil separator 303 four-way valve 304 heat-source-side heat exchanger 305 heat-source-side fan 306 accumulator 307 heat-source-side expansion unit 308 heat exchanger related to refrigerant 309 bypass expansion unit 310 heat-source-side controller 400 load-side unit 401 load-side heat exchanger 402 load-side expansion unit 403 load-side fan 404 load-side controller 500 gas pipe 600 liquid pipe

The invention claimed is:

1. A backflow preventing device comprising:
a backflow preventing element connected between a power supply and a load and configured to prevent backflow of electric current from a side of the load toward a side of the power supply; and
a commutating device configured to perform a commutation operation for causing the electric current to flow to a plurality of commutation paths connected in parallel with a path having the backflow preventing element, the plurality of commutation paths being connected to an input portion of the backflow preventing element and directly connected to an output portion of the backflow preventing element, the electric current is made to flow through each of the plurality of commutation paths at independent timing, the commuting device includes a plurality of commutation rectifying elements that rectify the electric current flowing through the plurality of commutation paths; and
a hardware module that includes the plurality of commutation rectifying elements and the backflow preventing element, the hardware module includes an input per each of the plurality of commutation rectifying elements and the backflow preventing element and a common output, the hardware module is sized to reduce a recovery current and the plurality of commutating rectifying elements and the backflow preventing element being connected between themselves with wiring in only the hardware module.

2. The backflow preventing device of claim 1,
wherein the commutating device further includes
a transformer configured to induce a voltage in a secondary winding in the plurality of commutation paths by applying a voltage to a primary winding to perform the commutation operation, and
a transformer driver having a commutation power supply and a commutation switch and connected to the primary winding of the transformer, the transformer driver opening and closing the commutation switch based on a drive signal from a controller to control excitation current flowing toward the primary winding of the transformer from the commutation power supply, and wherein the module further includes the commutation switch.

3. The backflow preventing device of claim 2, wherein the module further includes the backflow preventing element.

4. The backflow preventing device of claim 1, wherein at least one of the plurality of commutation rectifying elements has a plurality of auxiliary commutation rectifying elements that are connected in series.

5. The backflow preventing device of claim 1, wherein the module includes the plurality of commutation rectifying elements connected in parallel.

6. The backflow preventing device of claim 1, wherein the commutation rectifying elements are elements employing a wide-band gap semiconductor.

7. The backflow preventing device of claim 6, wherein the wide-band gap semiconductor is composed of silicon carbide, a gallium-nitride-based material, or diamond.

8. A power conversion apparatus comprising:
a smoothing device configured to smooth output voltage;
a switch device disposed at a side of a power supply relative to the smoothing device and configured to short-circuit the power supply by opening and closing a switch;
a reactor disposed at the side of the power supply relative to the switch device; and
the backflow preventing device of claim 1, configured to prevent backflow of electric current from a side of a load.

9. The power conversion apparatus of claim 8, wherein the switch of the switch device and at least one or more of elements constituting the backflow preventing device are configured as a module.

10. The power conversion apparatus of claim 8, further comprising:
a rectifier configured to rectify electric power from the power supply in a case where the power supply is an alternating-current power supply,
wherein the module further includes the rectifier and the backflow preventing device.

11. The power conversion apparatus of claim 8, comprising:
an inverter configured to convert electric power into alternating-current power,
wherein the inverter is configured by employing a module included in the power conversion apparatus.

12. The power conversion apparatus of claim 8, wherein the load is a motor.

13. A refrigerating and air-conditioning apparatus comprising:
the power conversion apparatus of claim 8 for driving at least one of a compressor and a blower.

* * * * *